United States Patent [19]

White et al.

[11] Patent Number: 4,972,494

[45] Date of Patent: Nov. 20, 1990

[54] PACKAGE INSPECTION SYSTEM

[75] Inventors: Kenneth W. White, Lewisville; Bain C. McConnell; Calvin W. Henderson, both of Winston-Salem; Shannun W. Clark, Lewisville; William R. Collett, Winston-Salem; Charles F. deMey, III., Belews Creek; Nancy H. Hawley, Clemmons; Wallace R. Lassiter, Winston-Salem; James G. Madding, Jr., Walkertown; Michael A. Warren, Tobaccoville; David L. Wright, Pinnacle, all of N.C.

[73] Assignee: R. J. Reynolds Tobacco Company, Winston-Salem, N.C.

[21] Appl. No.: 247,556

[22] Filed: Sep. 22, 1988

Related U.S. Application Data

[63] Continuation-in-part of Ser. No. 160,935, Feb. 26, 1988, abandoned, and a continuation-in-part of Ser. No. 160,934, Feb. 26, 1988, abandoned.

[51] Int. Cl.$^5$ .............................................. G06K 9/00
[52] U.S. Cl. .......................................... 382/8; 382/1; 358/105; 358/106; 209/535
[58] Field of Search ..................... 209/535; 250/223 R, 250/223.2; 382/8, 12; 358/106, 105, 107

[56] References Cited

U.S. PATENT DOCUMENTS

| | | | |
|---|---|---|---|
| 3,246,297 | 4/1966 | Silverstein et al. | 340/149 |
| 3,500,063 | 3/1970 | Reno et al. | 250/223 R |
| 3,749,923 | 7/1973 | Husome | 250/223 |
| 3,791,741 | 2/1974 | Brenholdt | 356/163 |
| 3,891,324 | 6/1975 | Davies | 356/156 |
| 3,939,984 | 2/1976 | Butner et al. | 209/74 |
| 3,956,629 | 11/1976 | Gomm et al. | 250/223 R |
| 3,983,403 | 9/1976 | Dahlstrom et al. | 250/560 |
| 3,987,902 | 10/1976 | Burgess et al. | 209/75 |
| 4,002,823 | 1/1977 | Van Oosterhout | 358/106 |
| 4,011,155 | 3/1977 | Feustein et al. | 209/74 R |
| 4,053,056 | 10/1977 | Day | 209/73 |
| 4,188,544 | 2/1980 | Chasson | 250/560 |
| 4,245,243 | 1/1981 | Gutjahr et al. | 358/106 |
| 4,268,168 | 3/1981 | Demacle | 250/223 R |
| 4,277,176 | 7/1981 | Grosvernier | 356/394 |
| 4,367,045 | 1/1983 | Grosvernier | 356/394 |
| 4,367,405 | 1/1983 | Ford | 250/223 B |
| 4,454,542 | 6/1984 | Miyazawa | 358/106 |
| 4,500,203 | 2/1985 | Bieringer | 356/240 |
| 4,509,075 | 4/1985 | Simms et al. | 358/106 |
| 4,518,862 | 5/1985 | Dorn | 250/561 |
| 4,546,384 | 10/1985 | Kowalski | 358/107 |
| 4,630,225 | 12/1986 | Hisano | 364/559 |
| 4,639,592 | 1/1987 | Heilmann | 250/223 R |
| 4,734,766 | 3/1988 | Shiozumi et al. | 382/8 |
| 4,759,074 | 7/1988 | Iadipaolo et al. | 382/8 |

FOREIGN PATENT DOCUMENTS 0314521 5/1989 European Pat. Off. .
2200885 8/1988 United Kingdom .

OTHER PUBLICATIONS

"Analysis of a Model For Parallel Image Processing", Pattern Recognition, vol. 18, No. 1, pp. 1–15, 1985, Yalamanchili, S. and Aggarwal, J. K.

Primary Examiner—Leo H. Boudreau
Assistant Examiner—Michael Razavi
Attorney, Agent, or Firm—Grover M. Myers

[57] ABSTRACT

The invention provides package inspection systems which are capable of high speed sensing and evaluation of package integrity as packages are continuously conveyed in the manufacturing process. The systems are capable of measuring predetermined parameters of packages, e.g. cigarette packages, comparing the measured parameters with predetermined values, evaluating from the measured parameters the integrity of the packages and determining whether such packages are acceptable or, alternatively, should be rejected. The system can additionally obtain and store data on sensed package parameters for evaluating long-term and short-term manufacturing trends. In various embodiments of the invention, the system can inspect a single or plural package side(s), employing a single or plural line scan or area array camera(s) and may employ special optics to enable plural package side images to be obtained using a single camera. The invention also provides improved conveying systems for package inspection and master part detect systems which can be employed to obviate the need for synchronization between the inspection system and the conveying system.

20 Claims, 10 Drawing Sheets

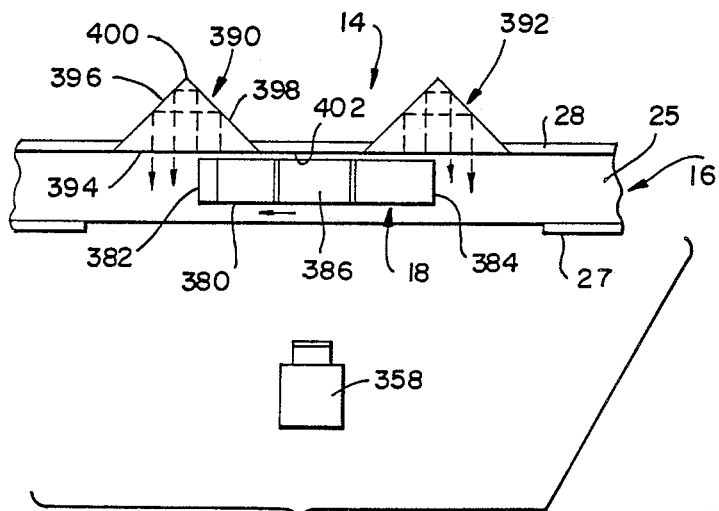
FIG. 8
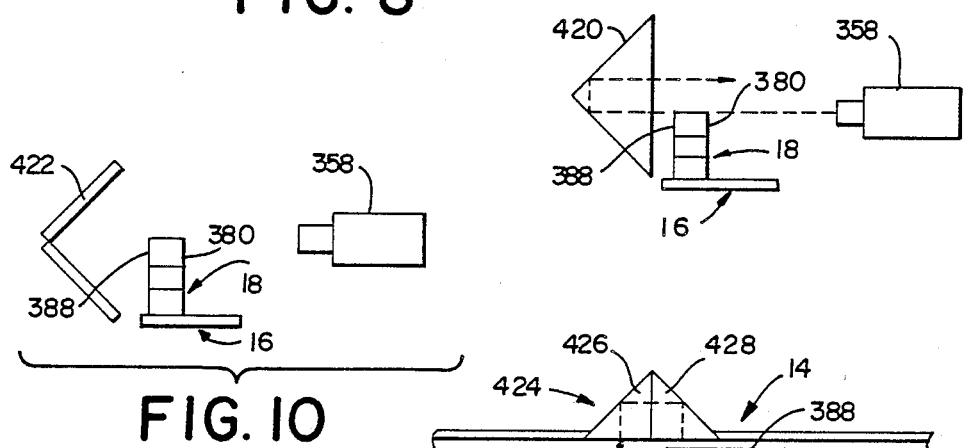
FIG. 9
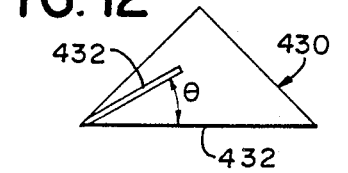
FIG. 10
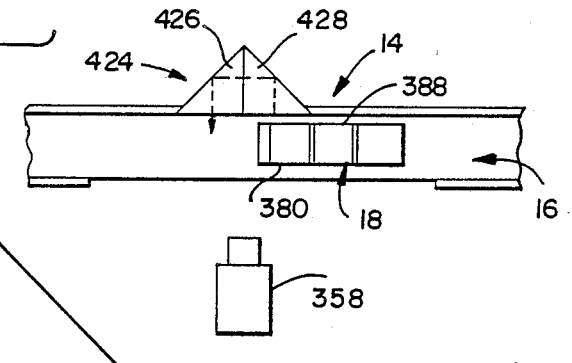
FIG. 11
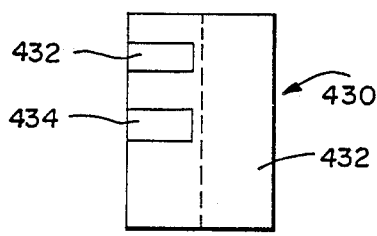
FIG. 12
FIG. 13

PACKAGE INSPECTION SYSTEM

CROSS REFERENCE TO RELATED APPLICATIONS

This application is a continuation-in-part of copending application Ser. No. 160,935, filed Feb. 26, 1988 and entitled "Method and Apparatus for Package Inspection System", and now abandoned and is also a continuation-in-part of application Ser. No. 160,934, also filed Feb. 26, 1988, and entitled "Method and Apparatus for a package Inspection System Using an Image Display" and now abandoned.

BACKGROUND OF THE INVENTION

The present invention relates, in general, to package inspection systems, and more particularly to high speed systems for sensing and evaluating the integrity of a package, rejecting those packages which do not meet specifications, obtaining data on sensed package parameters, and evaluating the data to determine error rates and trends.

Commercial packaging machinery, including machines which package products such as cigarettes, routinely operates at very high speeds, and a single machine may produce in excess of 700 packages per minute. Such packages may include a number of packaging elements which must be accurately assembled to produce a commercially acceptable product These elements include, in the case of a cigarette package, for example, a foil wrapper layer, an outer packaging envelope, and a closure stamp which is attached to two opposite sides of the packaging envelope and which extends across an exposed portion of the foil wrapper layer. Similar elements can be used in other packages, but for convenience of reference, the present invention will be described in terms of a conventional cigarette package. It will be understood, however, that the invention has application to any package made up of plural elements which must be present and properly aligned to produce a marketable packaged product.

Considerable attention has been directed, in the past, to the development of methods and machines for measuring and evaluating the integrity of the various elements in a multi-element package structure, for it is highly desirable that each package be consistent in its exterior appearance with other such packages, and that all of the packages be uniform in their exterior dimensions. Cigarette packages, for example, include printed labels on the outer packaging, and the positioning of the printing on such labels must be accurate and consistent. The packages also carry closure stamps which must be centered on the package and aligned with the label and with the printing on the label. Furthermore, the outer packaging envelope should be consistently positioned with respect to the foil wrapper layer so &hat a consistent amount of the foil is exposed above the packaging envelope. Other package parameters which should be detectable by a package inspection system include package end flaps which have not been properly closed, girth seams or wrappings which are loose or not completely sealed, misaligned printing, and other such defects. Because these parameters must be measured in a high production environment, the inspection system must be capable of operating at a high speed as well, so as not to slow down package production. In addition, inspection systems must be substantially insensitive to random or stray effects such as uneven spacing of the product as it leaves the packaging machine, stray light reflections from glossy package surfaces, and similar effects which are inherent in a production line One attempt to overcome the problems experienced with high speed package inspection systems involved the use of a conveyor apparatus having a pair of laterally spaced endless belt conveyors which engage the top and bottom ends of a package to move it through an inspection station. The belts are driven by pulleys which are driven from a single shaft. This shaft carries a coded disc which rotates in synchronism with the drive belt. A photocell detects the motion of the coded disc and provide spaced output signals corresponding to specified intervals of motion of the drive belts so that a count of these signals specifies the position of the package carried by the belts. The conveyor belts tightly engage the packages to be monitored so that the location of the package is accurately synchronized with belt motion. Electro-optical scanners are positioned along the path defined by the conveyor belts to sense predetermined patterns and characteristics on the package and to compare signals produced by the scanners with signals stored in memory to determine whether the packages were properly made. If package errors are detected, a reject signal directs the package to a rejection chute. However, such a system depends on precise positioning of the package in the conveyor belts, and does not allow for slippage or variable spacing between packages, since it relies upon a coded disc which is remote from the package actually being inspected.

Inspection systems have also been provided for individual articles, such as cigarettes, where each cigarette is tested for a specific characteristic and articles not having the required characteristic are rejected. Typically, such systems require a timing mechanism which is synchronized with the movement of the articles to generate timing pulses for use in operating the system. Again, however, maintenance of synchronization between the articles, the sensing apparatus, and the reject apparatus presents problems, and any uneven spacing of the product can produce undesired results.

Numerous patents have issued which disclose inspection systems for packages and in particular for cigarette packs which utilize detectors for locating defective packs and for producing reject signals. Photosensitive detectors have been provided for determining whether a pack has a tax label, for example, or whether each cigarette in a row includes the required filters. Other patents have suggested the use of photocells to inspect the sealed edge of a wrapper, and guide rails, guide brushes, and the like have been used to keep the packages to be inspected on a conveyor. However, continuing problems have been encountered in obtaining accurate and reliable measurements of package characteristics so that packages which do not meet specifications can be rejected, and such problems are particularly acute in high speed measurement systems where timing and synchronization problems become most apparent.

Because of the stringent requirements for consistent, uniform packages to meet high quality control standards for packaging machines, there is a definite need in the packaging art for an improved package inspection system, including both method and apparatus, which is capable of detecting various package elements, evaluating the measurements, and identifying selected packaging defects on a high-speed processing line so that substandard packages can be ejected from the line. Such a system should provide data relating to the numbers and types of defects which can be stored and evaluated to enable operators of the system to locate sources of problems and to detect trends which might indicate potential problems in the production line so that faults can be anticipated and corrections can be made in the process control to maintain the flow of product.

SUMMARY OF THE INVENTION

The present invention relates to a method and to the corresponding apparatus in a system for detecting packages which are travelling on a high-speed production line, measuring predetermined parameters of those packages, comparing the measured parameters with predetermined values, evaluating from the measured parameters the integrity of the packages, and determining whether the packages meet predetermined standards or should be ejected. Packages are supplied to the inspection apparatus on a conveyor from a high-speed packaging machine. As each package approaches an inspection station for evaluation, specially designed guides, or registration fingers, position the package on the conveyor so that as it moves through the station, it will be located a fixed distance away from one or more package detection cameras. As the package reaches the inspection station, a master position sensor, such as a retroreflective part detector, produces a trigger signal which enables the camera and also enable subsequent position sensors. In some embodiments of the invention, this trigger signal may activate two or more cameras as well as one or more light sources to directly or indirectly illuminate certain areas of the package to be inspected.

In one embodiment of the invention, the detecting camera is a line scan camera which scans each package, preferably in a vertical direction, to detect a pattern of, for example, light and dark areas which represent the various package elements, such as labels, closure stamps, printing on the labels, foil, open flaps, loose seams, and the like. In the line scan embodiment, multiple position detectors are located along the conveyor path and as the package traverses the inspection station, these detectors are encountered sequentially. Selected detectors trigger the line scan camera so that the particular area of the package which is aligned with the camera at that instant is scanned by the camera. As each detector enables the line scan camera, that sensor becomes disabled until the master part detector again triggers the system for the next package to be evaluated. The line scan camera compares for each scan the sensed pattern with a predetermined stored reference pattern and produces a reject signal for each inspection of the package that exceeds a threshold error level. Upon the completion of the last inspection of that package, any reject signal for that package is supplied to a reject station downstream from the inspection station, where the defective package is removed from the conveyor, as by an air jet.

In other embodiments of the invention, package inspection is carried out by means of one or more image cameras which respond to a trigger signal from the master part detector. The trigger signal activates one or more strobe lights, and the camera or cameras record images of one or more surfaces of the package. The images recorded by plural imaging cameras are combined into a single digitized composite image. If only a single camera is used, the images of plural package surfaces may be optically combined to provide the composite image. This image is then analyzed by a computer using scanning techniques to determine the positional integrity of the various packaging elements in the package structure. This analysis is accomplished by comparing the composite image with a predetermined pattern so that variations of the package from the desired arrangement of the several elements can easily be detected. Again, packages which are found defective by this analysis are removed from the production line by conventional package removal apparatus such as an air jet.

During the inspection operation, measured data is periodically sampled and stored to accumulate inspection statistics. The statistics are then correlated for trends or for reject counts, and an appropriate operator message is generated and sent to the operator display for use in process analysis and production line control.

The present invention, in each of its embodiments as disclosed herein, is a distinct improvement over prior art inspection systems since only a single moving conveyor is needed to carry the packages into and through an inspection station for performance of the inspection operation. The use of only a single moving belt for this purpose avoids the complex synchronization problems that were encountered in the prior art, simplifies the mechanical structure of the apparatus, and reduces the overall cost of the system as well as decreasing the amount of maintenance that is required for the system. A further advantage of a single conveyor arrangement is that speed adjustments can easily be made to the conveyor line to assure optimum package spacing and package arrival at the evaluation station. Furthermore, the provision of a reject station which operates in response to the detection of a defective package is more easily provided.

The present invention represents a significant advance in the art since it provides synchronization between the package inspection system and the package itself, rather than the conveyor. The use of a master position detector to trigger the package inspection process as the package moves into the inspection station avoids those problems in prior synchronized inspection systems which arose because of variations in package spacing, because of varying conveyor belt speeds, and because of package slippage on the conveyor. In the present invention, packages are inspected upon arrival at the inspection station, when they are detected by the master position detector. The line speed of the packages and the spacing between the packages on the conveyor line have no effect upon the quality of package inspection provided by the instant invention.

BRIEF DESCRIPTION OF THE DRAWINGS

The foregoing, and additional objects, natures and advantages of the present invention will be more clearly understood from the following detailed description of preferred embodiments thereof, taken in conjunction with the accompanying drawings, in which:

FIG. 8 is a partial top plan view of the system of FIG. 7 showing the relative positions of the camera, package and reflectors;

FIG. 9 is a partial side elevational view of a variation of the system of FIG. 7, showing a camera, the leading surface of the package to be inspected, and a horizontal prism for viewing the rear surface of the package;

FIG. 10 is a partial side elevational view of a modified version of the system of FIG. 9;

FIG. 11 is a top plan view of another variation of the system of FIG. 7;

FIG. 12 is an end view of a prism with mirrors embedded therein for use in the system of FIG. 7;

FIG. 13 is a front elevational view of the prism of FIG. 12;

DESCRIPTION OF PREFERRED EMBODIMENTS

Although the packaging inspection system and method of the present invention is applicable to a wide variety of package structures wherein the structures are identical and are to be inspected for conformity with predetermined standards, the disclosure herein will be specifically directed to cigarette packages not only for convenience of illustration, but because they are typical of a multi-element package which must be inspected at a high rate of speed. In each of the drawings, common elements carry the sam number.

Figure 1:
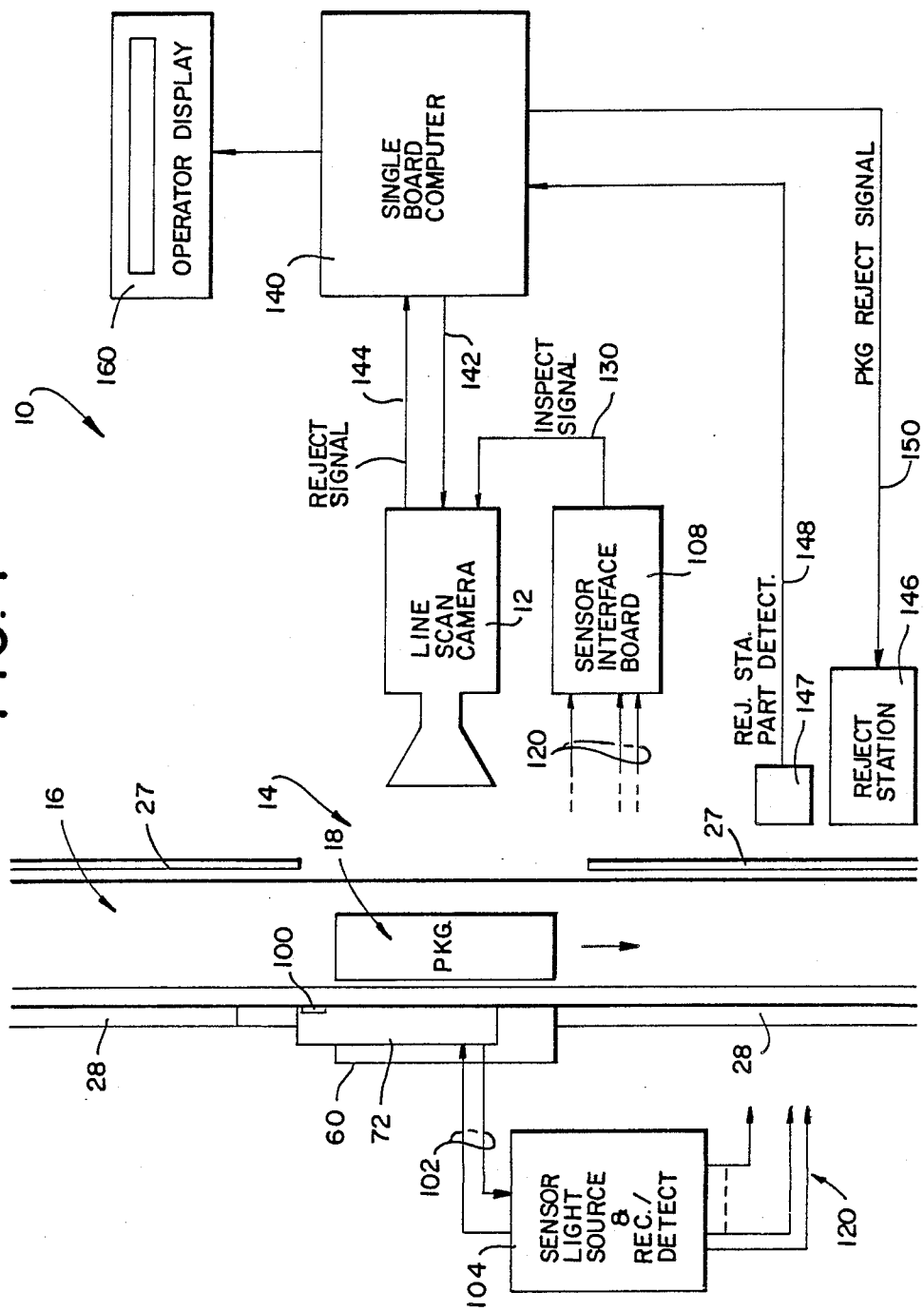
FIG. 1 is a block diagram of an inspection system constructed in accordance with a first embodiment of the present invention and utilizing a line scan camera.

Turning now to a more detailed consideration of the present invention, there is illustrated in FIG. 1 in block diagram form a package inspection system generally indicated at 10. The inspection system includes a line scan camera 12 located at an inspection station generally indicated at 14, where packages to be inspected are positioned for sensing by the camera 12. A conveyor 16 carries a package 18 through the inspection station and past the line scan camera 12 as the camera periodically scans the package to detect various parameters of the package. As illustrated in diagrammatic form in FIG. 2, the package 18 may be a cigarette package which includes a foil wrapper 20, a sleeve overwrap envelope 22, and a closure stamp 24, as is conventional. The packages 18 are conveyed sequentially on the moving conveyor 16, which may be a belt-type conveyor having a continuous belt 25 supported on a frame 26. A front retaining guide wall 27 and a corresponding rear retaining guide wall 28 are mounted on frame 26. The retaining guide walls are removed at the inspection station to permit access by the inspection equipment 30, to be described.

Figure 2:
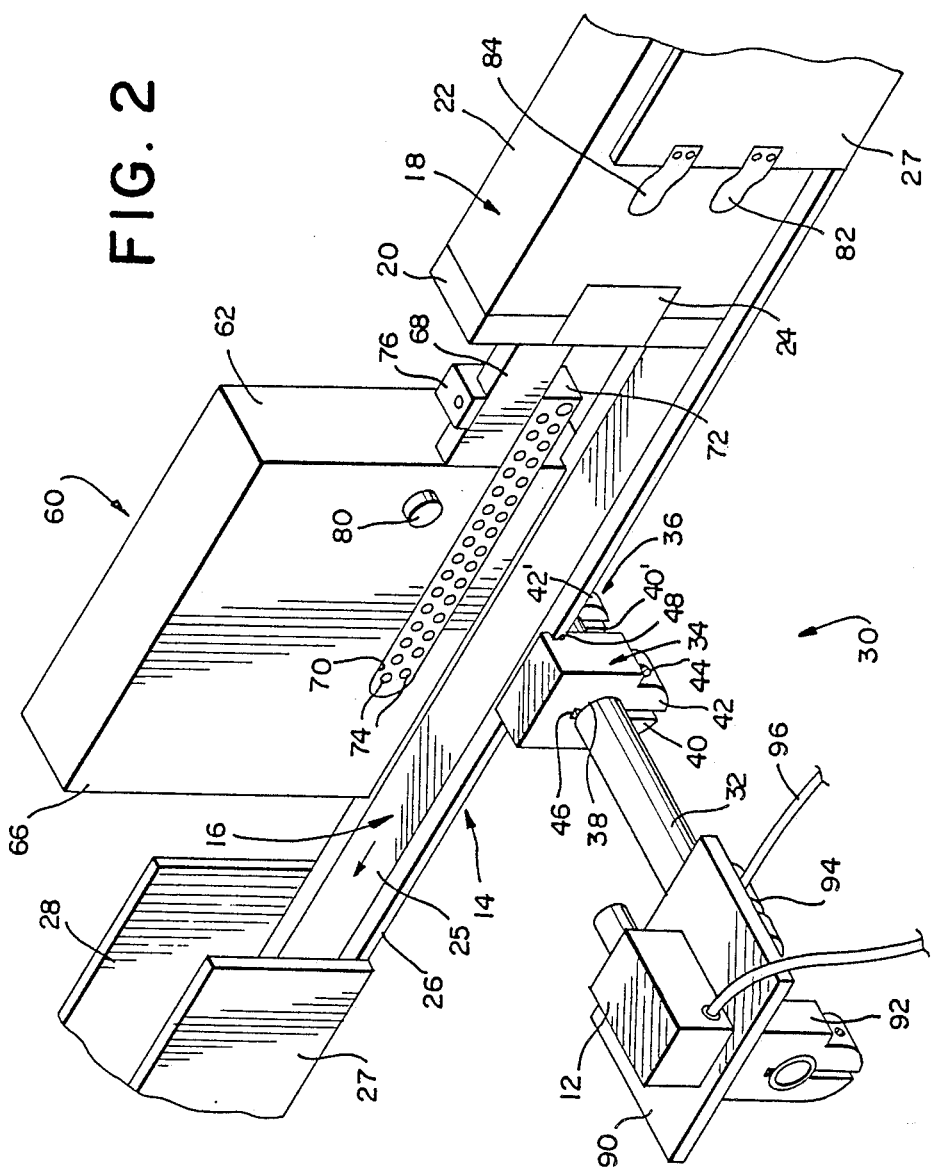
FIG. 2 is a diagrammatic perspective view of apparatus used in the system of FIG. 1.

In the embodiment of FIG. 2, the package inspection equipment 30 is shown as being a portable unit which can be readily clamped to a conveyor frame such as frame 26 at any location where inspection of the packages is desired. The equipment is secured to a mounting bar 32 which carries a pair of slidably mounted clamp elements 34 and 36. These clamps engage opposite sides of the conveyor support frame 26. Each of the clamping elements may be in the form of a split block having an aperture 38, which receives the bar 32, and a pair of spaced arms 40 and 42 which are slightly spaced apart to define a slot but which may be drawn together by a suitable screw 44 to compress the arms together and secure the clamp element on bar 32. If desired, a keyway 46 may be provided in the clamp element for alignment with a corresponding key on bar 32.

The clamp element 34 incorporates a horizontal groove 48 which engages the conveyor frame 26. In similar manner, the clamp element 36 includes a groove 50 which engages the opposite side of the conveyor frame 26. Clamp element 36 is secured on the bar 32 by means of a pair of split arms 40' and 42' and the two clamp elements can be pressed toward each other to engage opposite sides of the conveyor frame 26. The elements are tightened in place by set screws 44 to hold the inspection assembly 30 on the conveyor frame.

The clamp element 36 carries a package detector assembly 60 which provides a backdrop for the line scan camera, provides a registration surface for the package while it is in the inspection station, and provides a support for the position detectors used in conjunction with the line scan camera. Thus, in one form of the detector assembly 60, a housing 62 is mounted on or forms a part of the clamp 36 and includes the groove 50 for engaging the frame 26 of the conveyor. The housing 62 includes a front wall surface 66 which is positioned vertically and adjacent the rear edge of the conveyor belt 25 when the inspection assembly 30 is secured to the conveyor 16. The surface 66 preferably is a color which contrasts with the color of the package to be inspected so that a clear line of demarcation is provided between the edge of the package and the background provided by housing 62 as the package is being inspected by the line scan camera 12.

Mounted to the right hand edge of the housing 62, as viewed in FIG. 2, is a registration railing 68 which is aligned with the front surface 66 of the housing and which extends parallel to the conveyor 16. The surface 66 and railing 16 replace the section of the rear railing 28 which is removed to provide access for the inspection equipment. The front surface of railing 68 and surface 66 provide a rear guide surface for package 18 as it moves through the inspection station. Housing 62 also provides an elongated slot 70 which receives a sensor unit 72, which preferably is an elongated housing carrying a plurality of position detectors 74 in a staggered array. These position detectors preferably are retroreflective part detectors, although other suitable optical sensors may be used. The sensor unit 72 preferably is permanently mounted in the slot 70, although it may be desirable to mount it for longitudinal motion along the slot, as by means of a clamp 76 which grips the upper edge of the registration railing 68. Such adjustability allows the sensor unit to be moved longitudinally along the conveyor 16 by a small amount to move the position detectors with respect to the conveyor so as to synchronize the position detectors with the desired operation of the line scan camera.

As an option, the housing 62 may also carry a proximity detector 80 for detecting the presence or absence of a foil wrapper on each package as it passes through the inspection station.

The front guide railing 27 preferably carries a pair of flexible registration fingers 82, 84 which extend slightly into the path of packages approaching the inspection station to shift each package toward the rear of the conveyor and into contact with the registration railing 68 and the registration surface 66. In this way, each Package will be at a predetermined and fixed distance from the inspection camera as it passes through station 14 so that accurate observations of package parameters can be made.

A camera support platform 90 is also mounted on mounting bar 32 by means of a pair of clamping elements 92 and 94. These elements are similar to element 34 and are slidably mounted on bar 32 to position platform 90 with respect to the conveyor 16. Preferably, the clamping elements incorporate keyways to engage a suitable key carried in bar 32 or, if desired, to engage a longitudinally extending ridge (not shown) on the bar to permit alignment of the several clamping elements and thus of the entire inspection assembly 30.

Clamping element 94 may carry a support rod 96 on which a suitable lamp (not shown) for illuminating the package may be mounted.

The detectors 74 are optical detectors for sensing the passage of a package 18 past the sensor unit 72. These detectors are aligned along the length of the sensor unit, preferably in two rows, with the sensors of each row being offset from the sensors of the other row; in one embodiment as many as 40 position detectors are provided. Although a variety of detectors may be used, in a preferred form of the invention the detectors are retroreflective units utilizing fiber optics. Thus, each of the detectors may consist of a bundle of optical fibers some of which carry infrared light from a suitable source and the remainder of which return reflected light back to a receiver/detector. In the absence of package 18, there is no reflected light so the return fibers in a particular bundle carry light below a threshold level, and the detector produces no output signal. However, when a package 18 passes in front of the detector, the light from the source group of fibers is reflected into the receiver group of fibers and is detected to produce an output signal indicating the presence of the package. When the package moves past the activated detector, so that there is no longer light reflected to the receiver fibers, that detector switches off and is disabled until it is again enabled by a master position detector. The master detector may be the element 100 which is shown as being the first element on the sensor unit to be covered by a package to be inspected. Alternatively, a separate detector element mounted near the detector assembly 60, as on the registration railing 68, may be provided.

Figure 3:
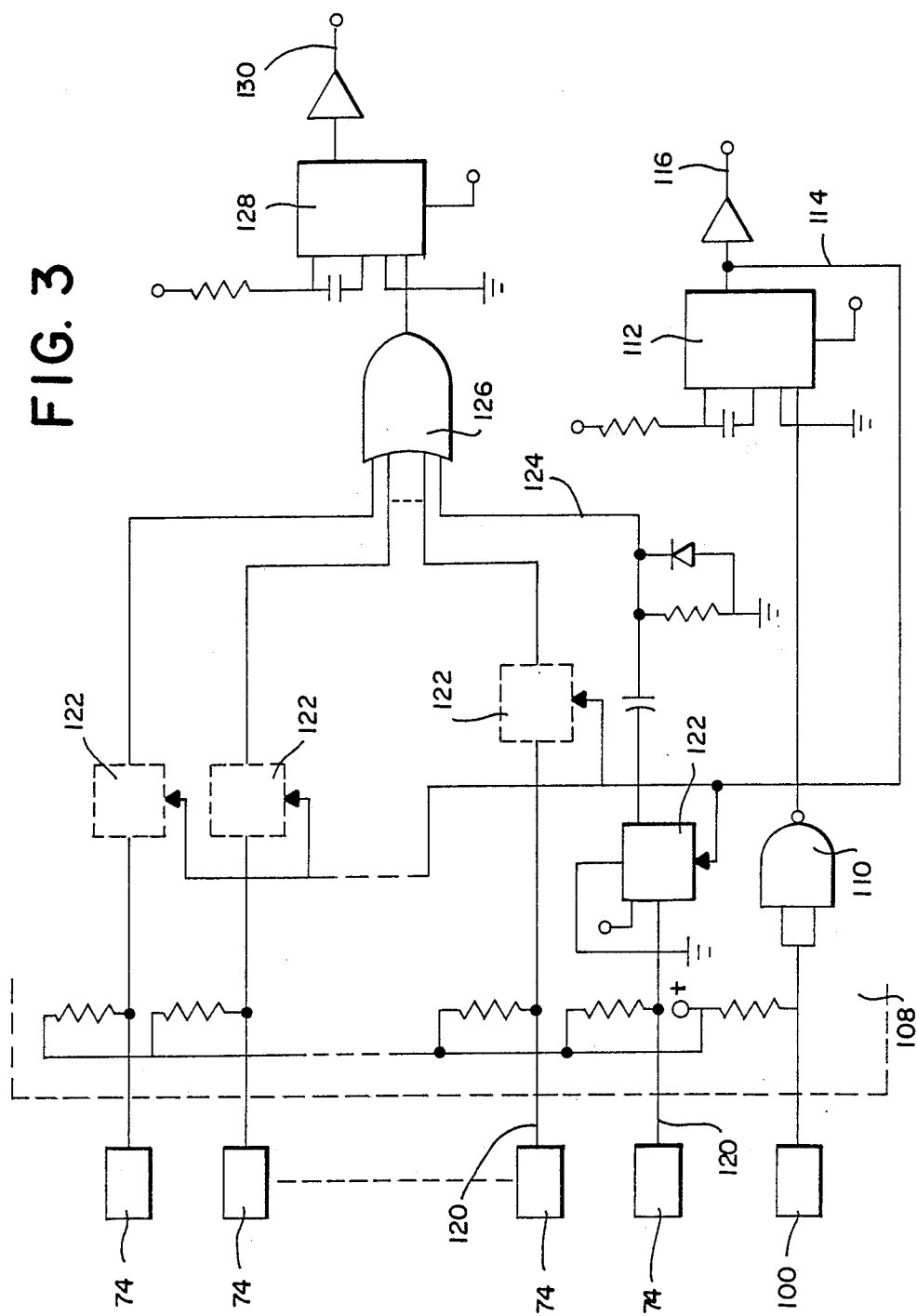
FIG. 3 is a schematic block diagram of the position sensor circuitry used with the system of FIG. 1.

Returning to FIG. 1, the line scan camera 12 is shown as being aligned with the detector assembly 60 and its sensor unit 72 at the inspection station 14. As the package 18 moves into the inspection station, its presence is detected by the master detector 100, which, for example, is connected by way of a fiber optic cable 102 to a light source and receiver/detector unit 104 which than produces an output signal on line 106. This signal is directed to a sensor interface board 108, illustrated in diagrammatic form in FIG. 3. The signal on line 106 is fed through a logic gate 110 to activate a flip flop circuit 112 to produce on line 114 an enable signal which enables the remainder of the position detectors 74. Circuit 112 also produces an enable signal on output line 116. As the package moves along the conveyor past the sensor unit 72, each of the position detectors 74 is covered in sequence, causing that detector to receive a reflected light signal which is transferred via optical fiber cable 102 to the light receiver 104 to produce a corresponding output signal from the receiver/detector 104. These output signals are supplied by way of lines 120 to the sensor interface board 108. As shown in FIG. 3, the signal from each position detector activates a corresponding flip flop 122 which produces an output signal on its corresponding output line 124. This signal is supplied through a logic "OR" gate 126 to an output flip flop circuit 128 which, when activated, produces a trigger signal on output line 130. This trigger signal is supplied to the line scan camera to activate the camera to scan the package along a single scan line.

The line scan camera 12 includes a single line of sensor cells which record a pattern corresponding to the optical characteristic of the package along the scan line. The camera repeats the package scan each time it receives a trigger signal from a position detector, so that a plurality of scans are made of the package as it moves through the inspection station. As many package scans may be made as are required to determine the integrity of the package being inspected. Thus, for example, if only a relatively small number of package parameters are to be measured as the package moves through the station, than only a few of the position detectors are activated to produce output signals when they detect the presence of the package. For example, if only four of the position detectors are enabled, then the passage of the package past the sensor unit will produce four trigger signals on line 130 which will, in turn, produce four line scans by the camera 12.

As illustrated in FIG. 1, the camera 12 is connected to a computer 140 by way of lines 142 and 144. The computer stores reference data which is representative of the desired package configuration, and thus of the desired pattern output from the line scan camera. Each scan of the camera is compared with corresponding stored reference data to determine whether the output signals produced by the package being inspected match the stored signals. If the differences (errors) exceed a threshold value, the line scan camera produces a reject signal on line 144 which is delivered to the computer 140. The computer waits for the defective package to arrive at the reject station 146 and then activates the reject mechanism to remove the package from the conveyor. The reject station preferably incorporates an optical part detector 147 which enables the computer to count intervening packages until the package to be rejected arrives at the reject station. The output signals from the reject part detector are supplied by way of line 148 to the computer, and when the targeted package reaches the reject station, a reject signal is supplied by way of line 150.

The computer 140 periodically interrogates the line scan camera to obtain and store data relating to the differences between the stored reference data and the measured parameters so as to obtain information concerning the number and nature of the errors which are being detected. Even if these errors are not above the reject threshold, the accumulation of errors can indicate trends which will be of interest to the package machine operator, for trends will indicate whether the machinery is gradually moving out of specification. The accumulated data is displayed on a display unit 160 to permit easy operator monitoring of the overall packaging system.

In a reduction to practice of the invention, the line scan camera 12 was a Honeywell Model HVS-270 line scan camera produced by Honeywell Visitronic, P.O. Box 5077, Englewood, Colo. 80155. The part detectors 74 and 100 were Keyence Model FS-17 obtained from Keyence Corp. of America, 20610 Manhattan Place, Suite 132, Torrance, Calif. 90501. The single board computer 140 was a Custom Electronic Systems Model CES-338, obtained from Custom Electronic Systems, Inc. 197 Forum Parkway, Rural Hall, N.C. 27045. The operator display 160 was a Vorne Model 2015 produced by Vorne Industries, 5831 Northwest Highway, Chicago, Ill. 60631.

Figure 4:
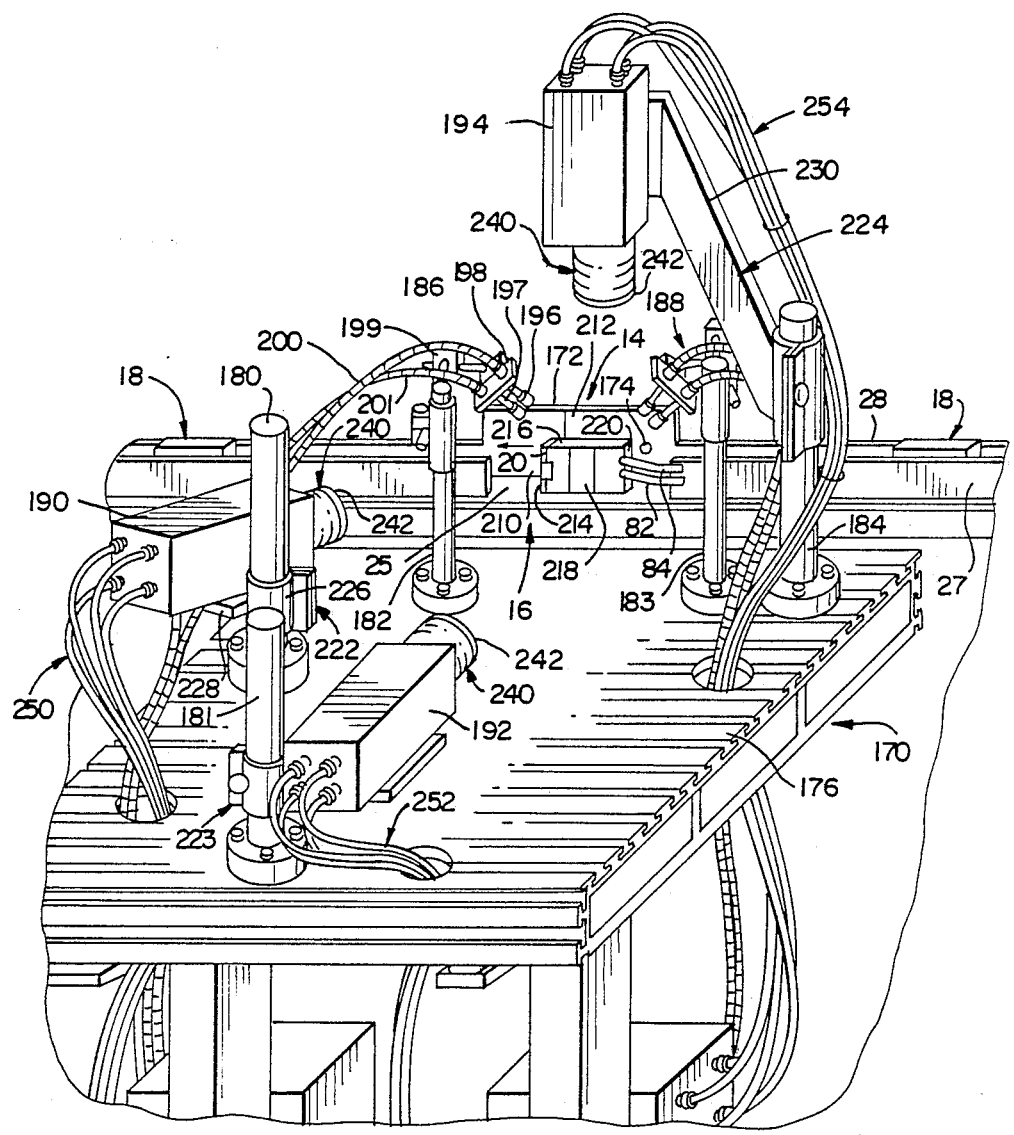
FIG. 4 is a diagrammatic perspective view of a second embodiment of an inspection system in accordance with the present invention and utilizing three imaging cameras.

Although the line scan camera discussed above works extremely well, there are occasions when it is desired to provide a more comprehensive inspection of a package than is possible with even multiple line scans. In such a case, it has been found desirable to provide full images of one or more surfaces of the package for display and analysis, and such a system is illustrated in the embodiment of FIG. 4. In this embodiment, the multiple position detectors 74 illustrated in FIG. 2 are not required, since only one "picture" or image of each package is required. This image is then evaluated by computer scanning techniques, to be described, thereby eliminating the need for synchronizing multiple scans of the package with the motion of the package through the inspection station; all that is required is that the system be triggered as the package enters the inspection station, so that a single image is obtained. Thus, the package is inspected upon its arrival at the inspection station and the line speed of the package and its spacing on the conveyor line have no effect on the quality of the inspection.

Referring now to FIG. 4, an image inspection system 170 is shown in its assembled and operational form at an inspection station 14. The system is adjacent a package conveyor 16 on which is carried a series of packages 18 to be inspected. These packages, which are illustrated as being cigarette packages of the type described with respect to FIG. 2, are conveyed sequentially on the continuous moving conveyor belt 25, the packages travelling between front and rear wall retaining guides 27 and 28 through the package inspection station 14 which is defined by an opening in the guide walls 27 and 28 to provide access by the imaging camera to be described. In the region of the inspection station 14, the rear guide wall 28 is replaced by a rear registration wall 172. A pair of registration fingers 82 and 84 move the package 18 against the rear registration wall 172 as the package passes through the inspection station so that the package will be properly positioned for imaging. The fingers extend into the opening in the front wall 27 provided for the inspection station, and preferably are secured to the front wall. These fingers are preferably of a light spring metal to lightly urge the package against the rear registration wall without slowing the package on its passage through the inspection station. A part detector 174 is mounted on the rear registration wall 172 near the entry to the inspection station; that is, near the right side thereof as viewed in FIG. 4, to detect the entry of a package into the station and to provide a signal when the trailing edge of the package uncovers the detector to indicate that the package is properly positioned in the station 14 for activation of the imaging system 170.

The imaging system includes a platform, or table, 176 which is located adjacent the conveyor 16 in alignment with the inspection station 14. The table may be movable for adjustment purposes, or may be permanently fixed. Mounted on the upper surface of the table are a plurality of mounting posts 180 through 184 on which are secured suitable lights and imaging cameras for inspecting the package. Thus, for example, support posts 182 and 183 carry lights 186 and 188, respectively, while posts 180, 181 and 184 carry imaging cameras 190, 192 and 194, respectively. Although two lights are illustrated. It will be apparent that additional lighting may be used. as required to properly illuminate the package which is to be imaged. Furthermore, although the use of three cameras is preferred in one embodiment of the invention, one or two cameras may be sufficient for many imaging purposes.

The three cameras illustrated in FIG. 4 are arranged for viewing three surfaces of the package as it passes through the inspection station; however, a single camera with suitable prisms or mirrors can also provide the desired images, as will be described below. The lights 186 and 188 must provide sufficient direct or indirect illumination of the package 18 at the package inspection station to permit each surface of the package to be clearly inspected by the cameras. Since the packages are moving rapidly through station 14, the lights preferably are strobe lights which provide a "stop-action" image of the package elements for evaluation. The lighting of the packages is typically accomplished by the use of sets of lights such as the fiber optic probes 196 and 197 which make up the light 186. These probes are secured in a mounting plate 198 which is fastened to the mounting post 182 by means of an adjustable clamp 199. The clamp is movable with respect to mounting post 182 to position the light probes with respect to the inspection station so as to provide the required lighting effects. The fiber optic probes are connected by way of optical cables 200 and 201 to a suitable source of illumination. In similar manner, the light 188 includes a pair of fiber optic light probes mounted on post 183 by means of an adjustable clamp. Again, the clamp is adjustable on the mounting post to permit accurate positioning of the fiber optic light probe with respect to the inspection station.

The rear registration wall 172 is mounted so as to be flush with the rear retaining guide wall 28 so that packages 18 will enter the inspection station smoothly and without interruption. The registration wall extends upstream and downstream (to the right and to the left as viewed in FIG. 4) of the location of package is during its imaging. Wall 172 is extended in height beyond the height of the retaining guide wall 28 so as to provide a known, contrasting background for the package to assist in its illumination and to improve the images obtained by the cameras.

Cigarette packages present significant imaging difficulties because of the presence of the foil wrapper 20 which usually is not smooth, and which therefore produces reflections and glare spots which make it difficult to detect the package elements of interest To assist in the illumination of the package foil wrapper and to obtain an even illumination of the sleeve overwrap envelope 22 and the closure stamp 24, a forward portion 210 of the registration wall 172 preferably is of a color to produce even, diffused illumination of the foil wrapper 20 by reflection of light from the light probes 196, 197. Preferably, the wall portion 210 is white or a similar light color. The remainder of the registration wall is a darker color, preferably black, as illustrated at 212. This portion is colored to provide a contrast with the coloration of the package overwrap envelope to permit accurate inspection of the edge of the package.

As illustrated in FIG. 4, the light 186 provides indirect, diffused lighting on the top surface 214 of package 18 by directing one of the light probes such as probe 197 onto the background portion 210 of the registration wall 172. Similarly, the light probe 196 may be directed onto the side wall surface 216 of the package, while the remaining light probes in light source 188 provide illumination of the front surface 218 and the bottom surface 220.

Preferably the registration wall 172 is vertical, although it may be desirable to skew the wall forwardly, toward the cameras, by an angle of between 2° and 5°, in order to enable the packages to be firmly positioned between the registration wall 172 and the registration fingers 82, 84, and further to assist in diffusing the light from the lights 186 and 188.

The cameras 190, 192 and 194 are conventional video cameras and are secured to their respective mounting posts by means of adjustable mounting brackets 222, 223 and 224, respectively. Each mounting bracket includes a clamp portion such as the clamp portion 226 on bracket 222 which engages the corresponding mounting post 180 to permit vertical and rotational adjustment of the bracket. The mounting bracket also includes a mounting plate such as that illustrated at 223 to which the corresponding video camera 190 is secured, as by a thumb screw or other mounting fastener (not shown). Bracket 228 is similarly constructed to support camera 192 on post 181. The mounting bracket 224 for camera 194 may incorporate an extension arm 230 between the clamp portion 226 and the mounting plate 228 in order to extend the camera 194 over the inspection station so as to provide a plan view of the surface 216 of the package. Alternatively, the camera 194 may be mounted adjacent the camera 192 to view the top surface 216 by means of an angled mirror or prism (not shown) mounted above the path of the package. Each of the cameras thus is directed to produce an image of a single corresponding surface of the package and accordingly the number of cameras utilized at the inspection station will be dependent upon the particular package elements being inspected. At least one of the cameras, such as camera 192, preferably is perpendicularly aligned to its corresponding package surface, in this case surface 218, to provide a full dimensional camera image output signal to thereby produce a geometrically accurate image. The remaining cameras can be directed to obtain perspective images of the other corresponding surfaces, although in the preferred form, at least two cameras will be optically perpendicular to their corresponding surfaces, as illustrated by cameras 192 and 194. In the embodiment of FIG. 4, camera 190 obtains a perspective image of surface 214.

In order to reduce glare and specular reflection from the illuminated surfaces of the package, the lens 240 for each of the cameras 190, 192 and 194 is provided with a light polarizer, illustrated at 242 on each of the camera lenses. If desired, the light probes 196 and 197 may also be provided with polarizers (not shown), in which case the polarizers on the probes and those on the camera lenses will be mounted in a cross direction so as to further reduce glare and reflection.

One, and preferably two or more, cameras are used to perform the package inspection of the system 170 in order to provide sufficient dimensional information for the collection of process data, and to insure package integrity. The locations of the camera or cameras which are employed in the system 170 are dependent upon the particular surfaces of the package to be inspected with respect to the conveyor belt, and upon the information which is to be obtained. If, for example, the inspection of surfaces 214 and 218 of package 18 would provide all of the necessary information for package integrity inspection, then only cameras 190 and 192 need be operated. If only surfaces 218 and 216 of the package are to be inspected, then only cameras 192 and 194 need be operational. If all three surfaces are to be monitored, then all three cameras would be used. As indicated above, camera 194 is illustrated as being positioned to record an image of surface 216 of package 18 by being located directly above the path of conveyor 16; however, alternatively, the camera could be positioned on a mounting post near that of camera 192 to provide a perspective view of surface 216 or an angled mirror could be located above the conveyor to permit the camera to be focused on top surface 216 by way of a reflected image. Dimensionally accurate information is best obtained when the camera is located along an axis perpendicular to the surface to be imaged, although the inspection of dimensions can be accomplished from an angular view, if desired. Furthermore, the detection of defects can be accomplished from either a perpendicular view or a perspective or angled view.

The images which are obtained by the cameras 190, 192 and 194 are converted to corresponding electrical signals in the cameras, and these signals are delivered by way of cables 250, 252 and 254 to an image processor 256 (FIG. 5) which combines the outputs from the three cameras to produce a single composite image. A suitable processor is an electronic prism such as that manufactured by VIDEK, division of Eastmark Technology. Analog signals representing the combined image are then delivered by way of cable 258 to an image analysis network 260, where the composite image is digitized, measured and displayed. A monitor 262 is provided to carry the composite image produced by the image processor 256.

The signal from the image processor 256 is supplied to an analog to digital converter 264 in network 260, and the digital output is applied by way of cable 266 to a video input/output circuit 268. This circuit supplies the image signals on line 266 by way of line 270 to the monitor 262 for display of a digitized composite image of the surfaces of the package being inspected. The digital signals are also supplied by way of line 272 to a frame memory 274 which samples selected image frames for analysis by a processor 276 and for comparison with predetermined values stored in a histogram processor 278. If any images received by the frame memory 274 do not match the image pattern established by the histogram processor 278, these differences are detected by the processor 276. When a threshold value is exceeded, indicating that the image under inspection does not meet the required quantitative integrity standards established by the histogram processor 278, the processor 276 produces a reject signal which is supplied by way of line 278 and an input/output port 280 to a reject output line 282. The signal on line 282 is supplied to a conventional package reject mechanism (not shown) downstream of the inspection station on conveyor 16.

The image analysis network 260 is controlled by a suitable computer 284 which is connected to network 260 by way of the input/output port 280.

In operation, as a package 18 moves past a part detect position sensor 174 to indicate that the package is properly positioned in the inspection station 14, a detect signal is supplied by way of line 286 through the input/output port 280 to computer 284, which produces a trigger signal on line 288 to activate a light source 290. The light source, which preferably is a strobe light, supplies illumina tion through the optical fiber cables leading to the light probes 196, 197 in each of the lights 186 and 188 upon receipt of the trigger signal. The trigger signal on line 288 is also supplied to video cameras 190, 192 and 194 to activate the cameras to produce images from the selected cameras upon illumination of the package by the light probes.

As indicated above, both the light probes and the camera lenses carry polarizers when the packages to be inspected incorporate high-reflectivity elements such as foil, metallic ink, or the like, for cross-polarization tends to reduce specular reflection and to darken highly reflective areas of the package. The use of cross-polarizers is, therefore, important in such circumstances, since they enhance the visual clarity of the package elements and produce a greater contrast between package elements which are specular in nature, such as foil, and those portions which are generally non-specular in nature, such as paper. The cross-polarizers thus permit accurate information to be obtained about glossy surfaces, such as the surfaces of cigarette wrappers. A further enhancement of the inspection system is obtained by providing a color filter on one or more of the camera lenses to enhance the contrast between various package elements and graphics. Alternatively, the color of the light source 290 can be selected so as to enhance such contrast.

Figure 6:
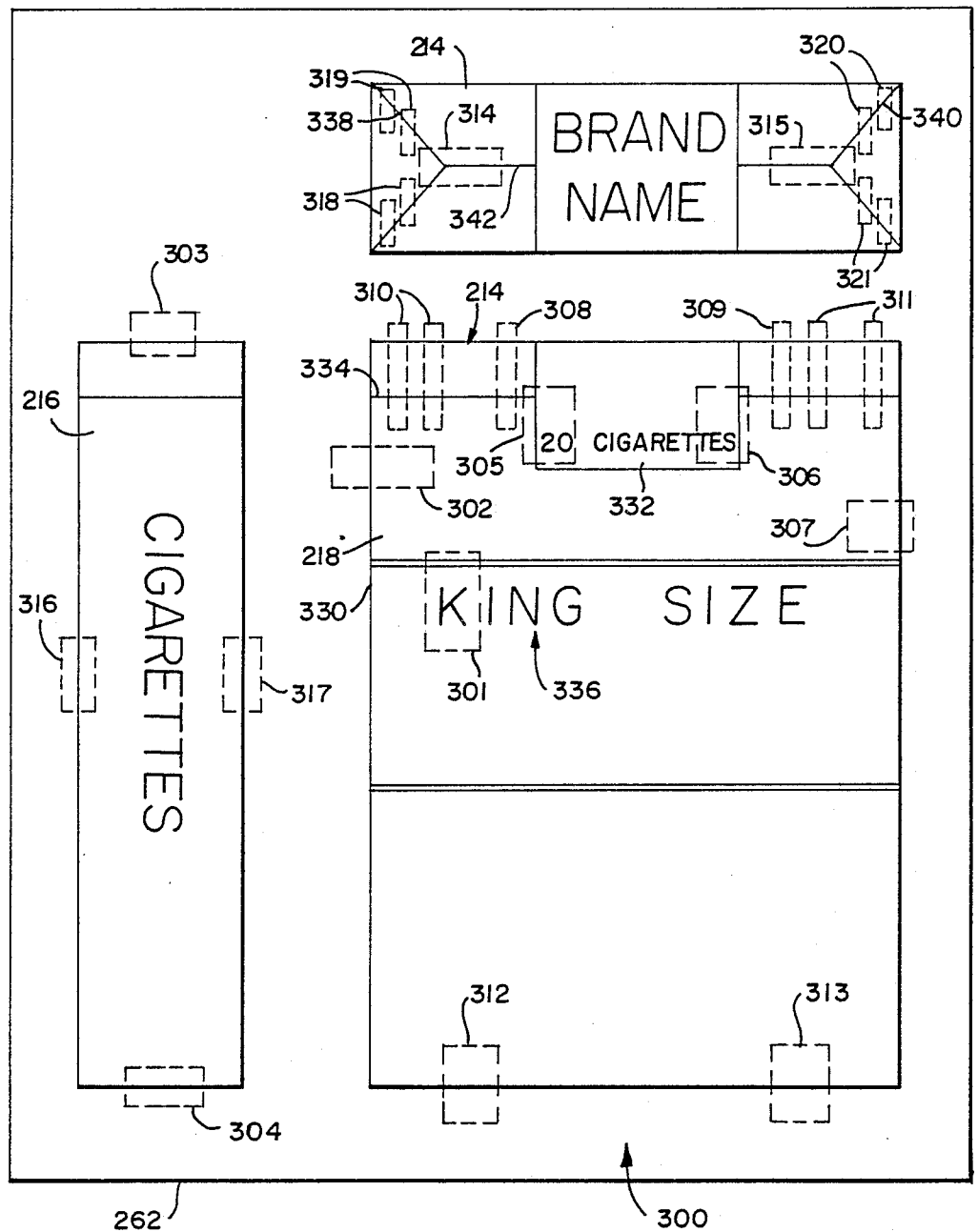
FIG. 6 is a diagrammatic illustration of the composite image obtained from the cameras of the system of FIG. 4.

The analog video signals produced by the cameras 190, 192 and 194 are compiled by the electronic prism 256 to provide a single, composite image 300 such as that illustrated in FIG. 6. The image is supplied in analog form to the image analysis network where it is converted to a digital form and is displayed on the monitor 262. As illustrated in FIG. 6, the composite image 300 includes, for example, the top panel 214, one side panel 216, and the front panel 218 of package 18. Although all three of these views are shown in FIG. 6 are being plan views, it will be understood that one or more of these views can be perspective views, and in particular with the camera arrangement illustrated in FIG. 4, the top panel or surface 214 of the package would be a perspective view, while the other two panels would be plan views. The full dimensional images are used to calibrate the display so that accurate measurements based, for example, on the number of pixels per inch on the display, can be obtained for each view, and the perspective view can be calibrated based on these measurements. Such calibration of the image then permits accurate computer analysis of the images so that reliable measurements can be made of all of the package surfaces and the various packaging elements.

The exact locations and the exact angles of the cameras and of the light sources, as well as the intensity of the light, its color, the use of polarizers on the lenses, and the use of filters will all be dependent upon the particular packages being monitored, the nature of the packaging elements to be detected, the reflectivity of the wrapping material, and like considerations.

Once the images recorded by the operational cameras are translated into the two-dimensional composite picture 300 illustrated in FIG. 6, the digital signals which represent that picture are processed by the processor 276, under the control of computer 284, so that the package images are compared to predetermined image values to permit a determination of package integrity to be made. Although a full frame comparison can be made of the composite image 300 obtained from the cameras 190, 192 and 194, it is preferred that comparisons be made only in those regions of the image which are critical to a determination of package integrity. Thus, selected digital picture segments are analyzed by electronically scanning those segments in the frame memory 274, where the digital signals representing the composite picture are stored. These eelected picture segments, or windows, are illustrated by the exemplary window areas 302 to 317 in FIG. 6, which windows are selected by the system operator to define the areas of the digitized composite image 300 which are to be measured for specific package feature characteristics. The digital signals stored in the frame memory 274 are scanned under the control of processor 276 and the areas within the windows are compared with previously stored signals in the histogram processor 278. The digital information contained in the regions of the windows may be scanned in either a horizontal or vertical direction to locate specified features of the package. For example, a change in intensity may be caused by the edge 330 of a package lying in windows 302, 303, 304, 307, etc., by a package element 882 such as a closure stamp having its edges lying in windows 305 and 306, by a package element such as a foil/label interface 834 lying in windows 308, 309, 310 and 311, by a package element such as lettering 336 appearing in window 301, and the like. Window 301, for example, can be used to determine the presence or absence of lettering, to determine whether it is properly aligned with the edge of the package, and to determine whether it is located at the proper part of the package. Instead of determining specific element locations, the windows may be scanned to detect the amount of light reflected from the package or the statistical relationship between light and dark areas, such as appear in the regions 314 and 315, due to the folding of the foil. Where the foil has been properly folded, there will be shadow lines of a particular size, for example, which produce a contrast to the usual highly reflective surface of the foil. If there is too much shadow, it may indicate that the fold is incorrect. Windows such as those illustrated at 318 to 321 may be used to detect the location of the foil fold lines 338 and 340, and these locations can be extrapolated to determine the location of the center fold line 342. Changes in intensity can be used to determine whether the wrapper color is correct, and other similar measurements of various package elements can be made using selected windows at various locations on the digital image 300.

Information concerning package integrity is supplied to computer 284 by processor 276 by way of lines 278 and 283, where accumulated values can be used to determine changes in package element measurements over a period of time. A consistent deviation of a measured element from the standard value will produce repeated error signals which are accumulated to identify a malfunctioning package assembly step. For example, in FIG. 6, if the positional measurement of the letter K in window 301 becomes consistently too close to the package edge 330, as measured in window 301, this would indicate that the paper wrapper mechanism is malfunctioning and causing the paper to become misaligned with the package during package manufacture. A consistent error signal would allow prompt identification and correction of the problem area.

The window are measurements thus can be used to readily evaluate the positional integrity of packaging elements in a cigarette package structure. Such elements include wrapper centering, correct printing of the wrapper in both horizontal and vertical directions, detection of wrapper skew, detection of closure stamp centering in both horizontal and vertical directions, detection of closure stamp skew, detection of flap closure, particularly the end flaps of the package, and detection of seam closures on the side of the package.

While the inspection system of FIG. 4 utilizes a plurality of cameras, it will be understood that only one or two cameras might be required for analysis of particular packages, depending upon the elements of the package which are to be detected. A single camera might be used, for example, when only gross defects such as missing or misaligned labels or closure stamps, missing foil, or open seams or flaps are to be detected, for such defects will show clearly in a single camera image. However, where more subtle elements are being inspected, additional cameras may be required to obtain the required resolution.

Figure 5:
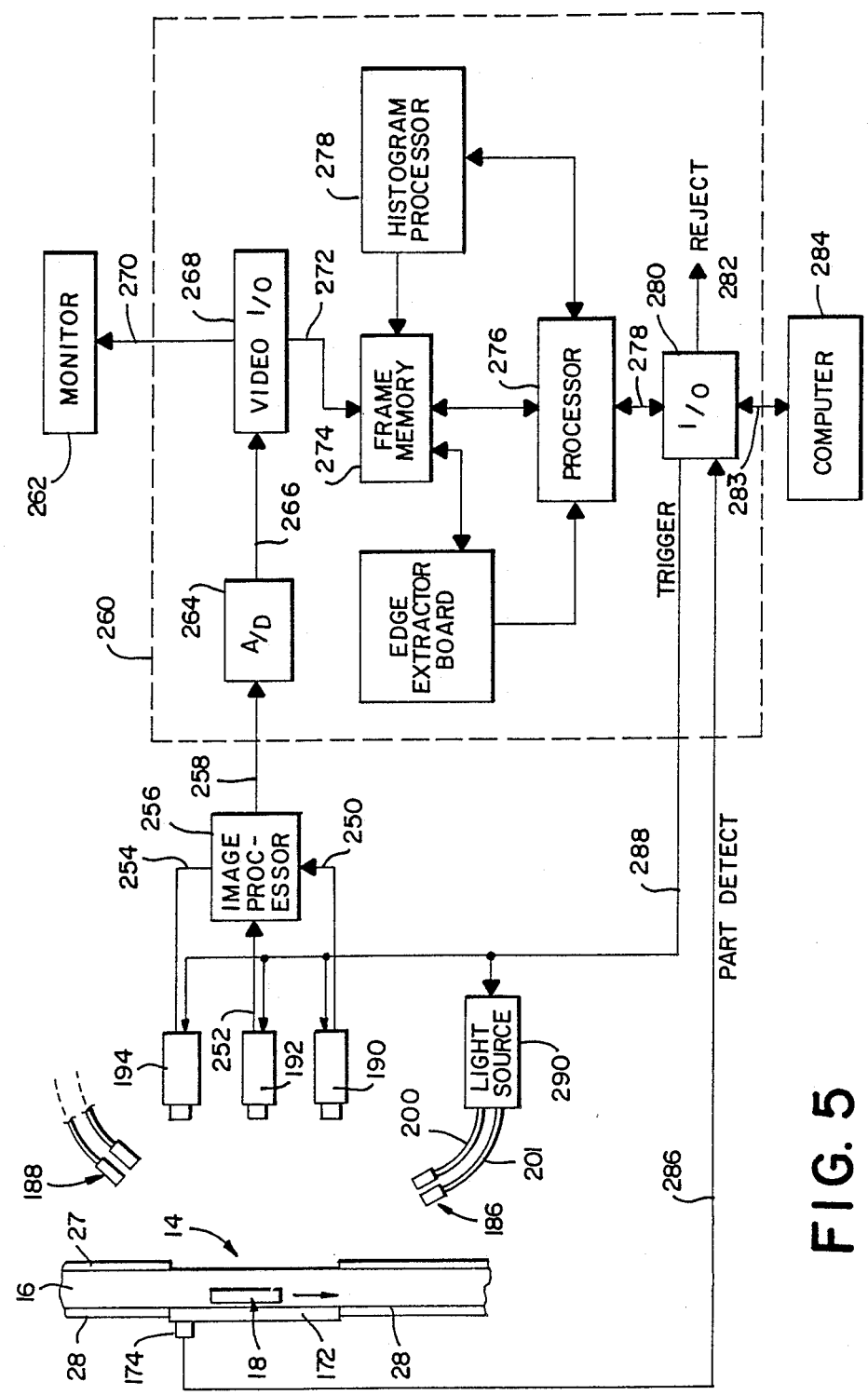
FIG. 5 is a block diagram of the system of FIG. 4.

The following is a specific example of the package inspection system and the inspection method of the present invention in accordance with the embodiments of FIGS. 4, 5 and 6.

Cigarette packages having a red paper wrapping and including foil tops with closure stamps folded over the tops and extending onto the red paper wrapper were oriented on a conveyor, resting on one side as illustrated in FIG. 4. Four surfaces of the packages were visible as they passed through the package inspection station 14. The rear registration wall 172 in station 14 contained a white diffuser background 210 which was located so as to be behind and upstream of the foil top portion 20 of the package at the moment of camera activation, the white background providing a uniform illumination of the foil area. The remainder of the rear registration wall was black to provide a contrast with the red wrapper on the package 18. At the inspection station the position indicator 174 operated to trigger the light source 290 to provide light at the fiber optic light probes 186 and 188 which were positioned to illuminate four surfaces of the package by either direct or indirect diffused strobed light. At the same time as the light source was activated to strobe the light probes, the three cameras were activated to record their respective views of the package. Camera 192 located perpendicular to the front surface of the package recorded the surface 218 in plan view, the camera 194, which was perpendicular to the surface 216, recorded a plan view of that surface, and the remaining camera recorded a perspective view of the end surface 214 of the package.

The two cameras recording the front and top surfaces of the red package were provided with red filters for increasing the contrast between the package color and the color of the registration wall 172. All of the cameras and lights included polarizers, with the light polarizers being in the cross direction to the camera polarizers to eliminate glare and specular reflection to thereby enhance the images obtained for the highly reflective portions of the package.

The conveyor 16 was operated at a speed sufficient to supply about 420 packages per minute, which is typical for a cigarette packer system. Since the packages in such a system are not evenly spaced, there is a burst rate for packages which is substantially higher than 420 per minute. Accordingly, the system was tested and functioned at up to 780 packages per minute. The average spacing between adjacent packages was approximately one-third of a package length.

The images captured by the cameras were passed by way of lines 250, 252 and 254 through an image processor to an image analysis network for display of a composite image on a monitor 262. All three camera images were viewed and analyzed simultaneously by means of the window scanning techniques discussed above. The system was set up to inspect the entire length of the front surface of the package and measurements were made of fourteen package elements. For example, a measurement was made of the amount of foil exposure above the top of the wrapper, between the edge 334 of the wrapper and the top surface 214 of the package. Another measurement was the centering of the closure stamp 332 on the package. Another measurement was the stamp position in the lengthwise direction of the package, which was accomplished by determining the position of the term "20 cigarettes" which was imprinted on the stamp. Measurements were also made of the skew of the closure stamp 332 by measuring the relationship between the line of lettering "20 cigarettes" and the top of the pack. In addition, a measurement was made of the wrapper position from left to right (as viewed in FIG. 6) of the package wrapper by determining the location of the letter "K" with respect to the edge 330 of the package. Measurement of wrapper alignment was made by comparing the top edge 334 of the wrapper to either the top of the pack or the top of the image 300, the latter measurement being possible since package alignment on the conveyor was found to be nearly constant. Finally, the overall pack length was measured using the side view of the package, by finding the top and bottom edges.

Although the image 300 shows the top, side and front views of the composite picture to be at the same scale, it may be desired to enlarge or reduce one or more of these views in order to facilitate visual inspection of the packages. However, even if the scales are changed for this purpose, compensation is made in the computer and processors of the analysis network so that the system is properly calibrated for comparison with standard values.

Since the camera 190 was angled with respect to the packages on conveyor 16, the end view of surface 214 was slightly distorted. However, this did not present a problem, since the flaw to be detected was a determination of whether the fold in the foil had been properly made. This was determined by comparing the light and dark areas of reflection on surface 214, with bad folds producing larger shadows, and missing foil resulting in exposed cigarettes within the package and a consequent reduction in the amount of reflected light. These measurements were made for the foil on both sides of the stamp 332, as viewed for surface 214 in FIG. 6. By establishing high and low threshold limits for the amount of light and dark contrast permitted, accurate readings of package condition could be obtained, with packages showing an excessive amount of dark area being rejected. On the front surface of the package, measurements were made of the wrapper in a substantially neutral area where the level of reflected light could be used to determine gross defects such as torn wrappers or badly smeared printing.

Figure 7:
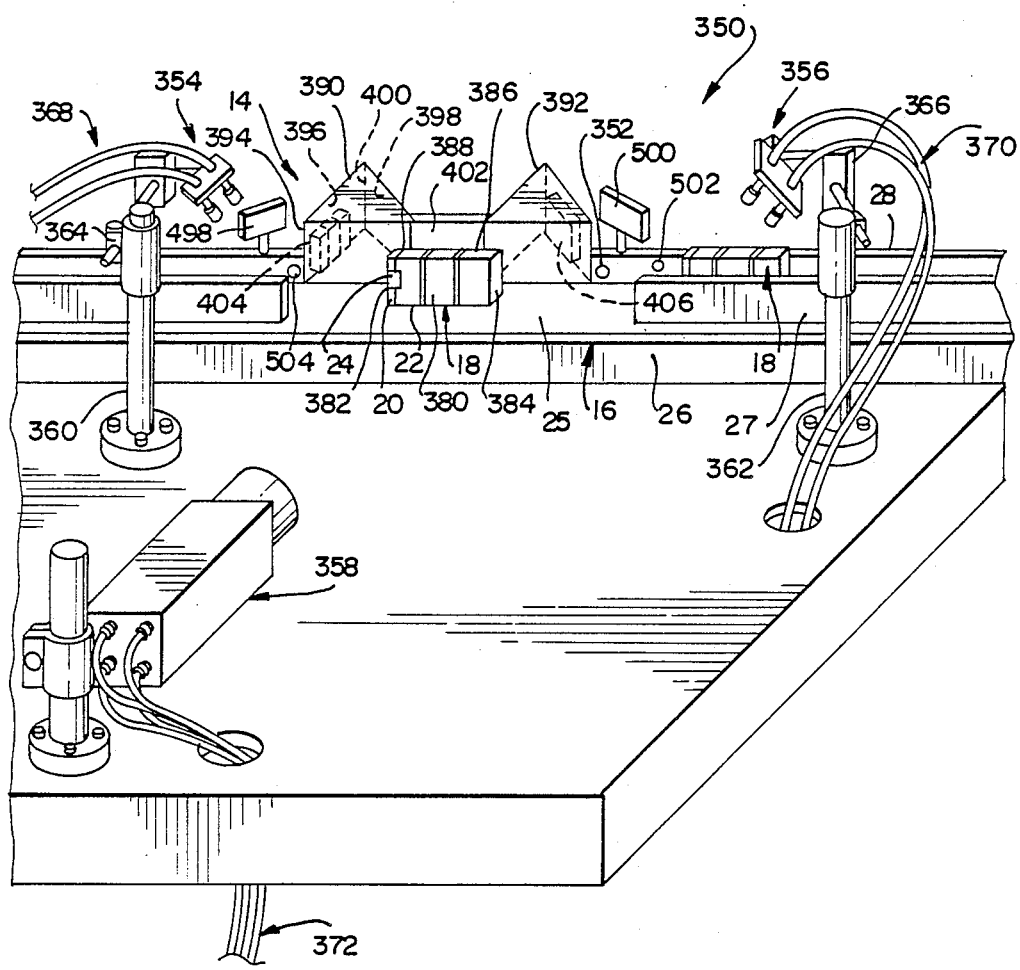
FIG. 7 is a diagrammatic perspective view of an inspection system in accordance with a third embodiment of the present invention, utilizing a single imaging camera.

Although the multiple camera system described above works quite well, it has been found that the system can be simplified through the use of a single camera and an arrangement of reflectors such as mirrors, prisms, or the like, while still performing well for many applications. Such a system provides an optical consolidation of the images of various sides of the package to be inspected to thereby eliminate the need for the electronic prism described above. Such a system is illustrated in FIG. 7, to which reference is now made. Thus, FIG. 7 generally illustrates at 350 an optical imaging system which is employed to produce a two-dimensional display of all or portions of two, three, four or even five different sides of a six-sided package. As indicated above, the system is particularly valuable in the inspection of cigarette packages due to the stringent requirements for the integrity of such packages. Packages such as the package 18 may be wrapped in a foil envelope, or wrapper 20, which is typically closed by a number of folds at each end and which is then inserted into a sleeve overwrap envelope 22 which is retained on the package by a closure stamp 24. The stamp overlaps the exposed foil wrapper 20 and is adhesively secured to the front and rear surfaces of the overwrap envelope 22. The inspection system 350 inspects this package to determine whether defects exist in the positional relationship of the packaging components, as previously described.

As in the previous embodiments, packages 18 are conveyed sequentially on the continuous moving conveyor 16, which may be a belt-type conveyor having a continuous belt 25 supported on a frame 26. The front retaining guide wall 27 and the corresponding rear retaining guide wall 28 are mounted on the frame 26 to guide the packages as they move along the conveyor. The retaining guide walls are removed at the inspection station, generally indicated at 14, to permit access by the inspection equipment, as in previous embodiments of the invention.

Each package 18 is conveyed in turn past a position sensor 352 at the inspection station 14, the sensor producing a signal upon passage of a package which, through circuitry described above, activates one or more elements of the inspection system. In the present embodiment, the inspection system includes one or more lights such a those illustrated at 354 and 356. These lights provide sufficient direct or indirect illumination of the package at the package evaluation station 14 to insure that each side of the package that is to be imaged will be properly illuminated for viewing by a camera 358, which preferably is a video camera, but which can be a line scan camera, if desired. Since the packages are moving rapidly through the inspection station, it is preferred that the light probes be strobe lights to provide a "stop-action" image of the package as it passes through the inspection station. Typically, the light sources 354 and 356 are fiber optic light probes which may be mounted, for example, on light standards 360 and 362 in the manner discussed with respect to FIG. 4. Thus, the light probes are mounted on adjustable brackets 364 and 366, with fiber optic cables 368 and 370, respectively, leading to a suitable light source such as that illustrated at 290 in FIG. 5. Alternatively, the light sources may provide continuous lighting of the package, particularly in cases where the camera 358 is a line scanning camera rather than a video imaging camera.

The package 18 which is being inspected includes five sides which are available for viewing by camera 358 for detection of package elements and, in the case of a video camera, for display of a package image. The package has a front, or near, surface 380 facing the camera, and remote surfaces including a top, or leading surface 382, a bottom or trailing surface 384, a first side surface 386, and a rear surface 388. The package surface resting on the conveyor is masked, and thus is not available for inspection with the present arrangement.

In order to view all five sides of the package 18 with a single camera, the optical inspection system 350 includes image reflectors arranged along or above the conveyor at the inspection station 14. In the embodiment illustrated in FIG. 7, the rear wall 28 is replaced, in the inspection station, by a pair of spaced prisms 390 and 392. The prism 390 has its front surface 394 aligned parallel to the rear wall 28 and perpendicular to the surface of the conveyor belt 25, with its rear angled reflective walls 390 and 398 extending back from the front surface 394 and joining in a vertical apex 400. The prism 392 is similar to prism 390 and is similarly arranged with its front surface parallel to the rear guide wall 28. The two prisms are joined at the center by a rear registration wall 402 which is parallel to and flush with the front surfaces of the two prisms 390 and 392, so that the prisms and registration wall provide a back guide surface for the package 18 as it passes through the inspection station. If desired, positioning fingers such as those illustrated at 82 and 84 in FIG. 4 may be used at the inspection station to position the package against the rear registration wall.

The camera 358 is positioned so as to inspect at least a part of the front surface 380 of the package as it passes through the inspection station. Preferably, the camera is arranged with its optical axis perpendicular to the surface 380 so that a full dimensioned view of that surface is obtained. The reflecting surfaces provided by prisms 390 and 392 produce reflected images 404 and 406 of the package to permit the camera to inspect the top surface 382 and the bottom surface 384, respectively, as well as to inspect portions of the rear surface 388. By raising the camera 358 so that it is slightly above the package 18, the top surface 386 can also be viewed either directly by the camera or in one or both of the reflected images 404 and 406. Thus, the prisms 390 and 392 permit inspection of five surfaces of the package at the same time, producing a single composite image of all of these surfaces. If desired, the surface of the registration wall 402 may also be reflective to provide an additional image of the package 18, or the wall 402 may be replaced by a horizontal prism, as will be discussed below.

Thus, by the use of the reflectors illustrated in FIG. 7, any of the five available surfaces of the package can be viewed by the video camera 358 to produce output signals on cables 372 which represent the composite image of the package surfaces. These signals may then be supplied directly to an image analysis network such as that illustrated at 260 in FIG. 5, without the need for an electronic prism of the type illustrated at 256. The signals may then be processed in the manner described with respect to FIGS. 5 and 6 to analyze the various elements of the package 18 so as to determine whether the package meets predetermined standards.

As illustrated in FIG. 7, the image reflectors 390 and 392 are prisms; however, it should be understood that other reflecting surfaces such as Porro prisms, folded mirrors, fiber optic coherent image conduits, or the like, can be used. The optical system of the embodiment illustrated in FIG. 7 thus can include a single reflector or combinations of reflectors which provide viewable images of at least a portion of one or more remote sides of a package 18 to the camera 358.

FIG. 8 is a diagrammatic top plan view of the inspection system of FIG. 7, showing the package 18 on conveyor 16 in the inspection station 14. As illustrated, the reflectors 390 and 392 are prisms which project images of the respective end portions of the package 18 toward the camera 358. Although the wall 402 is illustrated as being a flat mirror, it is within the scope of the invention to utilize a horizontally oriented prism in that location so as to project a reflected image of the upper center portion of the rear surface of the package.

Numerous other optical systems can be utilized with the imaging camera 358 to provide the desired inspection of the package. Thus, for example, as illustrated in FIG. 9, a single horizontally mounted prism 420 can be mounted behind the conveyor 16, in place of the prisms 390 and 392 and the wall 402 of FIG. 7. Such a prism would project all or a portion of the rear surface 388 of the package toward the camera 358. FIG. 10 shows a similar arrangement wherein a hinged or folded mirror 422 is utilized in place of the prism 420 and is the optical equivalent of that prism, since it projects the same image of the rear surface 388 of the package 18. Thus, for purposes of the present invention, folded mirrors and prisms are considered optical equivalents and are essentially interchangeable.

FIG. 11 illustrates the use of a porro prism 424 as the reflecting element. The Porro prism is made up of a pair of prisms 426 and 428 in known manner, and is placed adjacent the conveyor 16 in the inspection station 14 in the manner previously described. The Porro prism reflects the image of the back surface 388 of the package 18 forwardly toward the camera 358 so that the back of the package is in the view of the camera. It is noted that the image systems of FIGS. 9, 10, and 11 not only produce a display of at least a part of the rear surface of the package, but produce that image while the camera is simultaneously viewing the near surface 380 of the package. If the camera 358 is perpendicular to the front surface 380, as illustrated in FIG. 9, then the prisms 420 and 424 or the folded mirror 422 simply provide a view of the rear surface of the package, and do not provide images of the top, bottom, or side surfaces.

In the preferred embodiment of the optical system utilized in FIG. 7, the reflectors 390 and 392 and the reflecting surface forming the wall 402 will be specialized prism reflectors, of the type illustrated at 430 in FIGS. 12 and 13. Such prisms 430 incorporate one or two mirrors indicated at 432 and 434 in FIG. 13. These mirrors are embedded in the material of the prism and are at an angle from the front surface of the prism. The prism, and the mirror surfaces 432 and 434, serve to reflect multiple images of the remote surfaces 382, 384, and 388 when the prism is in the vertical position illustrated in FIG. 13, and, when mounted in the horizontal position, serve to reflect images of the top surface 386 of the package.

Figure 14:
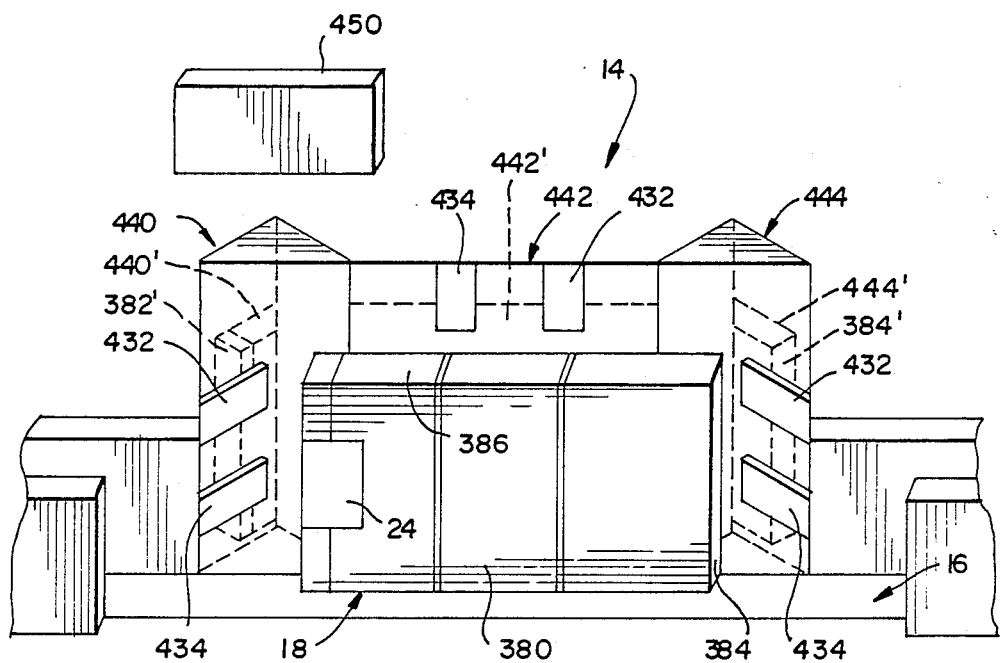
FIG. 14 is a front perspective view of a single-camera system in accordance with the embodiment of FIG. 7, utilizing three of the prisms of FIG. 12.

An optical system utilizing the specialized prisms of FIGS. 12 and 13 is illustrated in FIG. 14, wherein prisms 440, 442 and 444 are aligned along the edge of conveyor 16, with prisms 440 and 444 being vertical, and prism 442 being horizontal. Each of the prisms includes the two embedded mirrors 482 and 434, and the prisms and their included mirrors reflect images of corresponding surfaces of the package 18. Thus, prism 440 produces a reflected image 440' of the top surface 382', the prism 444 produces an image 444' which includes the bottom surface 384' and the prism 442 produces an image 442' of the back surface 388 of the package. The mirrors 432 and 434 embedded in each of the prisms reflect additional images at different angles of selected portions of the top surface 382 of the package, while mirrors 482 and 434 in prism 444 similarly reflect images of selected portions of the bottom surface 384. These mirrors may be positioned within the prisms to image specified features of the package, such as fold lines in the foil wrapper, so that a more accurate imaging of the package is obtained.

As a further option, an angled mirror 450 may be mounted above the prisms in order to provide a reflected image of the top surface 886 of the package. Preferably, the mirror will be angled at about a 45° angle from the vertical so as to direct the reflected image toward the camera 358 (not shown in FIG. 14). Such a mirror may also be used in conjunction with the prism 440 to provide a scanning view of the package as it passes into the inspection station to enable the prism arrangement to be used in conjunction with a line scanning camera for viewing, for example, the region of the top of the package 18.

Figure 15:
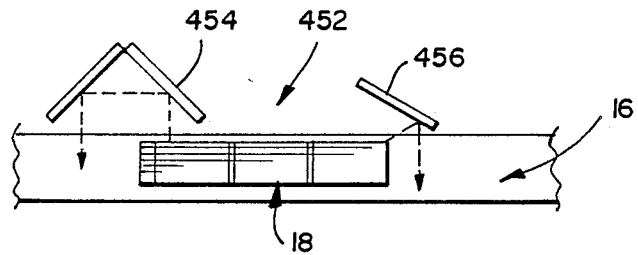
FIG. 15 is a top plan view of a single-camera system in accordance with the embodiment of FIG. 7 utilizing a hinged mirror and a flat mirror to view selected surfaces of a package.

FIG. 15 is a top view of an imaging system 452 which illustrates the use of a folded or hinged mirror 454 to reflect the image of a portion of the rear surface of package 18 toward camera 358 while a flat mirror 456 is arranged to reflect the image of a portion of the trailing, or bottom surface of the package. The system 452 permits viewing of portions of two different remote sides to the camera 358, but as long as the camera is perpendicular to, and aligned with, the front surface 380 of the package, the top surface 386 will not be imaged.

Figure 16:
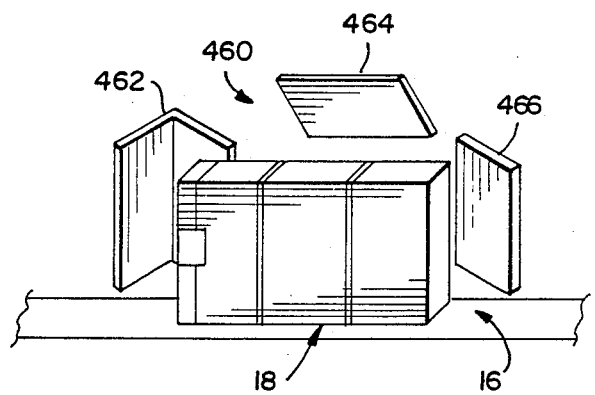
FIG. 16 is a front elevational view of a single-camera system in accordance with the embodiment of FIG. 7 utilizing a hinged mirror and two flat mirrors to view selected surfaces of a package.

FIG. 16 is a front perspective view of an imaging system for imaging portions of three different remote surfaces of a package. The system 460 includes a folded or hinged mirror 462 at the leading edge of the package. A top mirror 464 provides an image of the side surface and rear surface of the package, and an angled mirror 466 provides an image of the trailing, or bottom surface of the package. All of these mirrors direct their images toward the single video camera 358 described above.

Figure 17:
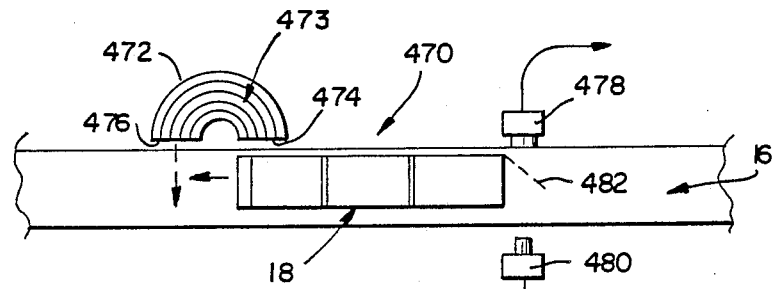
FIG. 17 is a top plan view of a single-camera system in accordance with the embodiment of FIG. 7, a fiber optic coherent image conduit and an LED light source for imaging selected surfaces of a package.

FIG. 17 illustrates an imaging system 470 which utilizes a fiber optic coherent image conduit 472 which incorporates a large number of individual optical fibers generally indicated at 478, bundled together to receive light at an input end 474 and to transmit that light from an output end 476. Such a conduit may be used to image any selected portion of the package 18 and to direct the image so obtained toward the video camera 358. The conduit 472 is shown as being located adjacent the leading edge of the package at the time the imaging takes place and its thus located in a position to determine whether a closure stamp, such as the stamp 24 previously described, is properly positioned on the package.

As an addition to the optical systems described above, it may be desirable to incorporate a photosensor element for determining whether a bottom flap of the package has been left unsealed. For this purpose, an LED source 478 may be provided adjacent the conveyor 16 at the location of the trailing edge at the moment when the video camera is activated to inspect the package. A corresponding photosensitive device 480 may be positioned on the opposite side of the conveyor to produce an output signal from the LED at the prescribed time if no flap is present. If, however, the package is improperly formed and a flap, indicated by the dotted line 482 in FIG. 17 remains unsealed and covers the LED at the instant of measurement, this will be detected by the sensor 480 and a signal supplied to the control system for rejecting the package.

Figure 18:
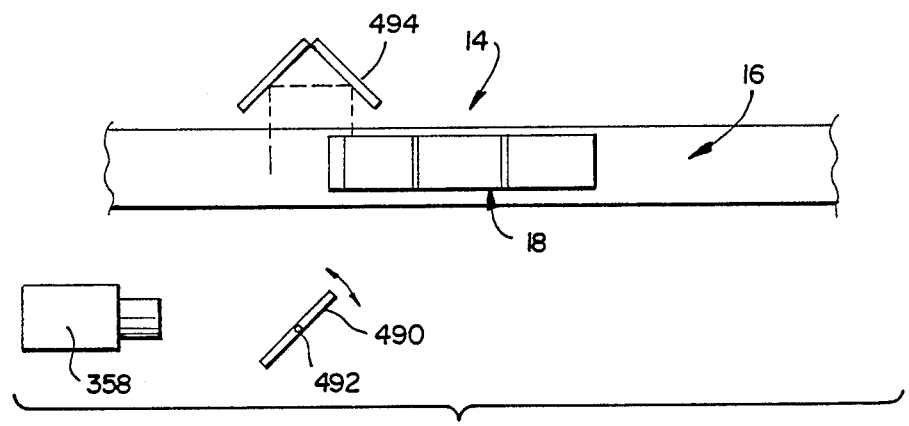
FIG. 18 is a top plan view of a single-camera inspection system in accordance with the embodiment of FIG. 7, utilizing a hinged mirror and a flat mirror for inspecting selected surfaces of a package.

Although it is preferred that the camera be positioned essentially perpendicular to the near surface 380 of the package to be inspected as it passes through the inspection station 14, other camera locations are possible and in some circumstances may be preferred in order to obtain the best view of the particular surface of the package which is of primary interest. Furthermore, in some installations it may not be possible to position the camera a sufficient distance from the inspection station in the perpendicular direction, and in such circumstances additional optical reflectors, such as a wobble mirror 490 illustrated in FIG. 18 may be positioned between the camera 358 and the inspection station 14. Mirror 490 may be caused to oscillate about a pivot point 492 so as effectively to scan the package 18 and any optical reflectors used in conjunction with the package. Thus, as illustrated in FIG. 18, a folded mirror 494 may be positioned adjacent the forward end of the package so that the near surface of the package can be viewed by way of mirror 490, with motion of the mirror also permitting a view of the front surface of the package. The use of an imaging mirror such as the mirror 490 has also been found desirable since it is possible to reduce depth of field focus problems by focusing the camera on the surface of the mirror 490 instead of on the package 18.

Figure 19:
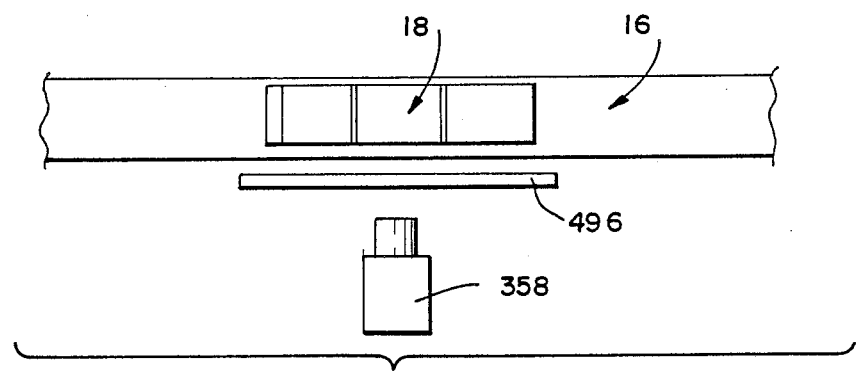
FIG. 19 is a top plan view of a single-camera imaging system in accordance with the embodiment of FIG. 7, utilizing a Fresnel lens and an imaging camera to inspect selected surfaces of a package.

Another embodiment of the present invention is illustrated in FIG. 19 which illustrates diagrammatically the use of a Fresnel lens 496 positioned between the package 18 and the camera 358. The Fresnel lens provides a view of the front surface of the package as well as the top, bottom and side surfaces. Although the Fresnel lens does not provide sufficient detail for detecting small packaging errors, it does permit a gross defect analysis and for many purposes is of significant value.

As previously explained, in each of the embodiments discussed with respect to FIGS. 8 through 19, the camera 358 responds to activation signals from a controlling computer or processor to produce output signals representing a composite image of the package, the image including at least part of one surface of the package, and as many as five surfaces, or parts thereof, depending upon the optical arrangement of the system. The output signals are supplied to an image analysis network such as that illustrated at 260 in FIG. 5, where the signals are analyzed in the manner discussed with respect to that Figure. Although the imaging system described with respect to the use of reflectors in FIGS. 8 through 19 is a video camera, it will be understood that a line scan camera of the type utilized in the embodiment of FIG. 1 may also be used in combination with the various reflector elements to scan the package as it passes through the inspection station.

The packages 18 which enter the inspection station must be aligned in identical positions with respect to the camera and the various reflectors to permit effective comparative analysis. The guide walls, the registration fingers, the rear registration wall, and in some cases the surfaces of the reflectors cooperate to align the packages as they enter the inspection station so that when the system is activated either to operate a line scan camera or to activate strobe lights and a video camera, the packages will be consistently positioned. In each case, sensor elements such as those described in detail with respect to FIG. 2, or part detectors such as those described with respect to FIG. 4 are used to detect the presence of a package and to synchronize the operation of the inspection system with the motion of the package through the station. It will be understood that the packages are supplied sequentially through the inspection station by the conveyor, with successive packages being spaced apart sufficiently to enable the sensing system to distinguish between separate packages.

While the present imaging system has been disclosed in terms of a single inspection station it will be understood that additional inspection stations can be used along the conveyor 16 if additional information is required for analysis of the packages. Furthermore, although particular arrangements of reflecting mirrors and prisms have been illustrated, additional reflectors can be used in combination with the reflectors already described. Thus, for example, in the embodiment of FIG. 7, additional reflecting mirrors 498 and 500 can be added to the imaging system to provide views of particular regions of the package. The mirror 498 can be positioned to provide an image of the leading surface 382 of the package when the package is located at a preinspection zone which may be located prior to the inspection station 14. The camera 358 would be activated by an additional part detector such as that illustrated at 502 (see FIG. 7) upstream of the part detector 352 to permit inspection of the leading edge for foil folds and closure stamp position prior to entry of the package into the main evaluation stat ion. Another arrangement might include reflectors positioned to transfer an image of the leading surface of the package from a preinspection location onto reflectors located in the package evaluation station 14, again with a preinspection activation of the camera being under the control of a part detector 502. In a similar manner, the packages can be inspected after leaving the evaluation station, for example by a mirror 500 which inspects the trailing surface of the package as it leaves the inspection station. A suitable part detector 504 (FIG. 7) may be provided for this purpose. Thus, it is apparent that a variety of spaced inspection or package evaluation stations can be utilized with suitable reflector mirrors or prisms, in accordance with the present invention.

It will be understood that the terms and expressions which have been employed herein are used for description, and not limitation, and there is no intention, In the use of such terms and expressions, to exclude equivalents of the features shown and described, or portions thereof, it being recognized that various modifications may be made within the scope of the present invention without departing from the true spirit thereof as defined in the following claims.

What is claimed is:

1. An apparatus for evaluation for positional integrity of packaging elements in a package structure comprising:
   (a) a package inspection station including an inspection wall;
   (b) a conveyor for transporting a plurality of spaced identical packages sequentially along a conveying path through said inspection station and past said inspection wall, said inspection being positioned vertically of and adjacent said conveying path; and
   (c) retaining means at said inspection station for urging said packages against said inspection wall as said packages pass through said inspection station to thereby provide constant positional alignment of said packages against said inspection wall;
   (d) a position sensor to detect the presence of the package structure to be evaluated at the package inspection station, and to produce a sensing signal;
   (e) at least one light source to illuminate the package structure;
   (f) recording means comprising at least one camera which responds to said sensing signal to produce camera output signals representing images of the package aligned against said inspection wall at the package inspection station, at least one camera being optically perpendicularly aligned to a surface of the package and said inspection wall while obtaining said package images; and
   (g) analysis means responsive to the camera output signals for evaluating said package images.

2. The apparatus as defined in claim 1 wherein the light source is a polarized light source.

3. The apparatus as defined in claim 2 wherein said recording means includes a polarizing filter which is cross polarized to the polarized light source.

4. The apparatus as defined in claim 1 wherein said package inspection station contains a rear wall retaining guide having a light colored portion and a dark colored portion.

5. The apparatus as defined claim 1 wherein said analysis means is a computer.

6. The apparatus as defined in claim 1 wherein said package structure is a cigarette package.

7. The apparatus of claim 1, wherein said camera is a line scan camera.

8. The apparatus of claim 1, wherein said camera is a video camera.

9. The apparatus of claim 1, wherein said recording means includes a plurality of video cameras for obtaining images of corresponding surfaces of the package structure.

10. The apparatus of claim 9, wherein said analysis means includes image processor means responsive to said plurality of cameras for producing a single composite image of said package.

11. The apparatus of claim 10, wherein said analysis means includes means for comparing signals representing segments of said composite image with predetermined standard signals representing a desired package configuration and for producing error signals when the composite image of said package differs from the desired package configuration.

12. The apparatus of claim 11, wherein said light source comprises a strobe light responsive to said sensing signal to illuminate said package.

13. The apparatus of claim 1, wherein said one camera is a line scan camera, said apparatus further including:
   a plurality of position detectors for sensing the position of said package structure in said inspection station and producing a plurality of corresponding position sensing signals, said line scan camera being responsive to said position sensing signals to produce line camera output signals corresponding to line images of said package structure.

14. The apparatus of claim 13, wherein said analysis means includes means for comparing standard signals representing desired pack age line scan patterns with said camera output signals and for producing error signals when said package structure line images differ from said desired package line scan patterns.

15. The apparatus as defined in claim 1 wherein the recording means is a camera which records views of one or more sides of a cigarette package.

16. The apparatus as defined in claim 1 wherein the recording means are at least two cameras which each view a separate portion of the package.

17. A package inspection system for evaluation of packages for defects comprising:
   (a) conveying means for transporting a plurality of packages having proximate and remote sides along a conveying path past a single inspection station along said conveying path,
   (b) a plurality of position sensors sequentially located along said conveying path to detect the presence of a package at said plurality of sequentially located positions sensors, said plurality of position sensors defining a plurality of corresponding package inspection positions at said package inspection station;
   (c) trigger signal means responsive to selected ones of said plurality of position sensors for generating trigger signals;
   (d) camera means responsive to said trigger signal means for producing an output signal representing on image pattern for at least a portion of one side of the package at each of said package inspection positions corresponding to said selected ones of said plurality of position sensors;
   (e) storage means for recording the output signals produced by the camera means at each of said package inspection positions corresponding to said selected ones of said plurality of position sensors; and
   (f) means for comparing the recorded output signals with reference pattern signals to obtain error signals representing package defects.

18. The package inspection system as defined in claim 17 wherein the camera means is at least one line scan camera.

19. The package inspection system as defined in claim 17 wherein said inspection station includes a stationary inspection wall, said plurality of package inspection positions being different package positions at said inspection wall.

20. The package inspection system as defined in claim 19 further comprising retaining means to provide constant positional alignment of said package against said inspection wall.

* * * * *

UNITED STATES PATENT AND TRADEMARK OFFICE
CERTIFICATE OF CORRECTION

Page 1 of 2

PATENT NO. : 4,972,494
DATED : November 20, 1990
INVENTOR(S) : Kenneth W. White et al.

It is certified that error appears in the above—identified patent and that said Letters Patent is hereby corrected as shown below:

ON TITLE PAGE:

[75] Inventors:

James G. "Madding", Jr. should be --Maddrey--.
"Michael" A. Warren should be --Micheal A. Warren--.

Col. 1, line 56, "&hat" should be --that--.
Col. 4, line 55, "natures" should be --features--.
Col. 5, line 61, "sam" should be --same--.
Col. 7, line 26, "Package" should be --package--.
Col. 8, line 10, "than" should be --then--.
Col. 10, line 66, "is" should be --18--.
Col. 11, line 45, "223" should be --228--.
Col. 11, line 48, "228" should be --223--.
Col. 13, line 62, "are" should be --as--.
Col. 14, line 31, "eelected" should be --selected--.

UNITED STATES PATENT AND TRADEMARK OFFICE
CERTIFICATE OF CORRECTION

PATENT NO. : 4,972,494

DATED : November 20, 1990

INVENTOR(S) : Kenneth W. White et al.

It is certified that error appears in the above-identified patent and that said Letters Patent is hereby corrected as shown below:

```
Col. 14, line 46, "882" should be --332--.
Col. 14, line 48, "834" should be --334--.
Col. 15, line 21, "are" should be --area--.
Col. 13, line 36, "390" should be --396--.
Col. 19, line 47, "porro" should be --Porro--.
Col. 20, line 15, "482" should be --432--.
Col. 20, line 25, "482" should be --432--.
Col. 20, line 33, "886" should be --386--.
Col. 20, line 65, "478" should be --473--.
```

In the claims:

Col. 24, line 44, "on" should be --an--.

Signed and Sealed this

Seventh Day of July, 1992

Attest:

DOUGLAS B. COMER

Attesting Officer

Acting Commissioner of Patents and Trademarks